(12) United States Patent
Aihara et al.

(10) Patent No.: US 6,939,018 B2
(45) Date of Patent: Sep. 6, 2005

(54) REFLECTING MIRROR

(75) Inventors: Susumu Aihara, Saitama (JP); Hiromi Kennmoku, Saitama (JP)

(73) Assignee: Fujinon Corporatioin, Saitama (JP)

( * ) Notice: Subject to any disclaimer, the term of this patent is extended or adjusted under 35 U.S.C. 154(b) by 35 days.

(21) Appl. No.: 10/695,468

(22) Filed: Oct. 28, 2003

(65) Prior Publication Data

US 2004/0120060 A1 Jun. 24, 2004

(30) Foreign Application Priority Data

Nov. 19, 2002 (JP) .......................................... 2002-335707
Jul. 9, 2003 (JP) .......................................... 2003-194319

(51) Int. Cl.$^7$ .............................. G02B 5/08; G02B 7/182
(52) U.S. Cl. ........................................ 359/883; 359/507
(58) Field of Search ................................. 359/580, 582, 359/584, 587, 588, 507, 883

(56) References Cited

U.S. PATENT DOCUMENTS

| | | | | |
|---|---|---|---|---|
| 4,457,598 A | * | 7/1984 | Shimabukuro et al. | 359/883 |
| 4,482,209 A | * | 11/1984 | Grewal et al. | 359/883 |
| 5,216,551 A | * | 6/1993 | Fujii | 359/884 |
| 6,238,781 B1 | * | 5/2001 | Anderson et al. | 428/216 |

FOREIGN PATENT DOCUMENTS

| | | |
|---|---|---|
| JP | 05-127004 | 5/1993 |
| JP | 08-286007 | 11/1996 |

* cited by examiner

Primary Examiner—Mark A. Robinson
Assistant Examiner—Alessandro Amari
(74) Attorney, Agent, or Firm—Frommer, Lawrence & Haug LLP; Matthew K. Ryan, Esq.

(57) ABSTRACT

Provided is a practical reflecting mirror having a plastic substrate and offering a good balance between reflectivity and durability, both of which are excellent. The reflecting mirror includes a plastic substrate, and a stacked structure formed on the plastic substrate. The stacked structure sequentially includes an underlayer film made of aluminum oxide, an adhesive layer formed with a chrome and copper film from the underlayer side, a reflection film made of silver, a reflectance adjusting layer, a protective film containing silicon monoxide (SiO) and having a film thickness of not less than 5 nm and not more than 20 nm, and a water-repellent film having a compound containing fluorine and silicon, and having a film thickness of not less than 1 nm and not more than 10 nm. This configuration allows preventing moisture permeating through the plastic substrate or moisture permeating through the surface of the reflecting mirror from entering the reflection film. Thus, the reflection film does not undergo corrosion, so that it is possible to ensure a good balance between the reflectivity and the durability, both of which are excellent.

2 Claims, 5 Drawing Sheets

REFLECTING MIRROR

BACKGROUND OF THE INVENTION

1. Field of the Invention

The invention relates to a reflecting mirror for use in various optical systems and more particularly to a reflecting mirror having a plastic substrate and a reflection film made of silver or aluminum.

2. Description of the Related Art

A reflecting mirror including a glass substrate and a silver (Ag) reflection film or an aluminum (Al) reflection film evaporated thereon has been heretofore known as a reflecting mirror for use in various optical systems. The silver reflecting mirror including the silver reflection film, in particular, is superior in spectral reflectivity because of having higher reflectance in the visible light range and is also superior in polarization characteristics, as compared to other reflecting mirrors.

Since the silver reflecting mirror, however, is weak in durability, the silver reflecting mirror is configured to include a protective layer made of aluminum oxide or the like, which is formed on the silver film. However, the silver reflecting mirror including the protective layer has a problem: more specifically, the protective layer causes deterioration in the spectral reflectivity of the silver reflecting mirror.

Reflecting mirrors adapted to solve the above-mentioned problem include a reflecting mirror disclosed in Unexamined Japanese Patent Application Publication No. Hei 05-127004, for example. The reflecting mirror disclosed in the publication includes a glass substrate, and a stacked structure including a silver layer, an aluminum oxide layer and a high-refractive-index dielectric layer, which are stacked on the glass substrate in this sequence. The reflecting mirror having this configuration improves in spectral reflectivity throughout the visible light range.

Moreover, a plastic substrate rather than the glass substrate has recently come into wide use for the silver or aluminum reflecting mirror described above, in that the plastic substrate allows substantial reductions in cost and weight and permits manufacturing even the substrate of large size or complicated shape with relative ease (see Unexamined Japanese Patent Application Publication No. Hei 08-286007, for example).

However, the plastic substrate has moisture permeability, which may cause reaction between silver or aluminum which functions as the reflection film and moisture, thus cause corrosion of silver or aluminum, and result in a decrease in the reflectance of the reflection film. Furthermore, the plastic substrate is unreliable in terms of mechanical strength or wear resistance, because adhesion between the plastic substrate and the film formed thereon is weaker than adhesion between the glass substrate and the film formed thereon.

The reflecting mirror disclosed in Unexamined Japanese Patent Application Publication No. Hei 08-286007 includes dense films made of aluminum oxide or the like, which are formed on both surfaces of the reflection film, so as to prevent deterioration in the reflection film and thus improve environmental resistance. However, the reflecting mirror including the dense film has another drawback to be remedied, such as a decrease in the reflectance, although the decrease is slight. Moreover, it is desired that the reflecting mirror further improve in environmental resistance and adhesion.

SUMMARY OF THE INVENTION

The invention is designed to overcome the foregoing problems. It is an object of the invention to provide a practical reflecting mirror having a plastic substrate and offering a good balance between reflectivity and durability, both of which are excellent.

A reflecting mirror of the invention comprises a plastic substrate, and a stacked structure formed on the plastic substrate, the stacked structure including: an underlayer film made of aluminum oxide ($Al_2O_3$); a reflection film formed on the side opposite to the plastic substrate with respect to the underlayer film; and a water-repellent film having a compound containing fluorine and silicon, which is formed on the side opposite to the underlayer film with respect to the reflection film.

The reflecting mirror of the invention includes the stacked structure formed on the plastic substrate, and the stacked structure has the underlayer film made of aluminum oxide ($Al_2O_3$), the reflection film, and the water-repellent film including the compound containing fluorine and silicon. This configuration allows the underlayer film to shut out moisture contained in the plastic substrate, thus preventing the moisture contained in the plastic substrate from entering the reflection film. This configuration also enables the water-repellent film to prevent the entry of moisture through the surface of the reflecting mirror on the side opposite to the substrate. Desirably, the underlayer film has a physical film thickness of not less than 40 nm nor more than 200 nm. Desirably, the water-repellent film has a physical film thickness of not less than 1 nm nor more than 10 nm. The reflection film is made of, for example, silver (Ag) or aluminum (Al).

In the reflecting mirror of the invention, desirably the stacked structure further has an adhesive layer sandwiched between the underlayer film and the reflection film, and a reflectance adjusting layer sandwiched between the reflection film and the water-repellent film. Desirably, the stacked structure further has a protective film containing silicon monoxide (SiO), which is sandwiched between the reflection film and the water-repellent film and located closest to the water-repellent film.

Other and further objects, features and advantages of the invention will appear more fully from the following description.

DETAILED DESCRIPTION OF THE PREFERRED EMBODIMENTS

Embodiments of the invention will be described in detail below with reference to the drawings.

[First Embodiment]

Figure 1:
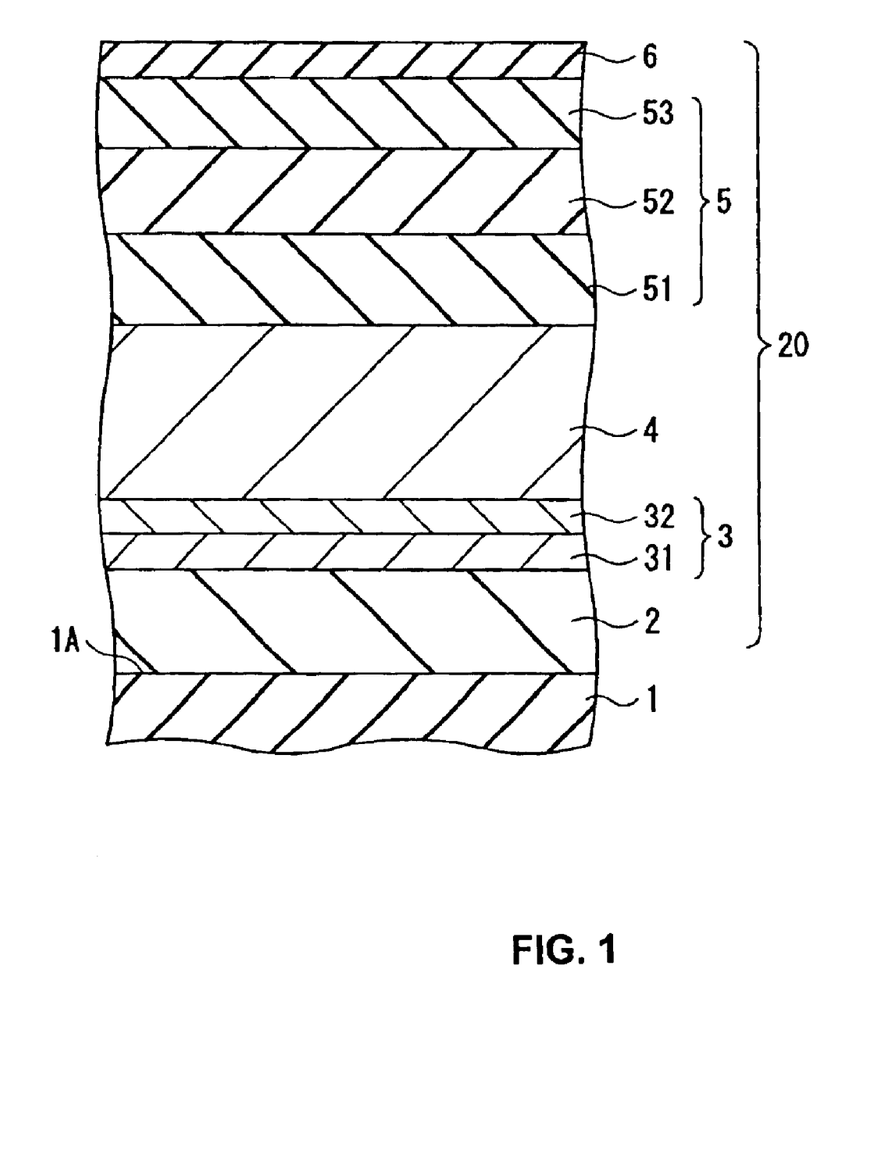
FIG. 1 is a cross-sectional view showing the configuration of a cross section of a reflecting mirror according to a first embodiment of the invention.

Firstly, the description is given with reference to FIG. 1 with regard to the configuration and function of a reflecting mirror according to a first embodiment of the invention. FIG. 1 is a cross-sectional view showing the configuration of a cross section of a stacked structure of the reflecting mirror according to the first embodiment.

As shown in FIG. 1, the reflecting mirror of the first embodiment comprises a plastic substrate 1, and a stacked structure 20 formed on the plastic substrate 1. The stacked structure 20 includes: an underlayer film 2 formed on the plastic substrate 1; a reflection film 4 formed on the side opposite to the plastic substrate 1 with respect to the underlayer film 2; and a water-repellent film 6 formed on the side opposite to the underlayer film 2 with respect to the reflection film 4.

The stacked structure 20 further has an adhesive layer 3 between the underlayer film 2 and the reflection film 4, and a reflectance adjusting layer 5 between the reflection film 4 and the water-repellent film 6.

The plastic substrate 1 is made of, for example, polyolefin plastic. Desirably, at least a stacked-structure-forming surface 1A on which the underlayer film 2 is to be formed is subjected to ion bombardment. More desirably, the stacked-structure-forming surface 1A is subjected to ion bombardment for about 20 minutes, using argon (Ar) or nitrogen ($N_2$). The ion bombardment takes place for the following reason: the ion bombardment allows removing impurities from the surface 1A and thus imparting desired surface roughness to the surface 1A, thereby improving adhesion between the plastic substrate 1 and the stacked structure 20 formed on the plastic substrate 1.

Since the underlayer film 2 made of aluminum oxide ($Al_2O_3$) has low moisture permeability, the underlayer film 2 can shut out moisture. Furthermore, aluminum oxide in itself has low moisture permeability. Therefore, the underlayer film 2 functions to prevent moisture permeating through the plastic substrate 1 from entering the adhesive layer 3 or the reflection film 4. Preferably, the underlayer film 2 has a physical film thickness of not less than 40 nm nor more than 200 nm. The reason is as follows. The underlayer film 2 having a physical film thickness of 40 nm or more can shut out external moisture with higher reliability, and the underlayer film 2 having a physical film thickness of 200 nm or less can prevent deterioration in strength because the underlayer film 2 does not increase in internal stress. More preferably, the underlayer film 2 has a physical film thickness of 100 nm.

The adhesive layer 3 has a two-layer structure comprising a chromium (Cr) film 31 and a copper (Cu) film 32, which are formed on the underlayer film 2 in this sequence. Preferably, the chromium film 31 has a physical film thickness of not less than 5 nm nor more than 15 nm, and more preferably a physical film thickness of 10 nm. Preferably, the copper film 32 has a physical film thickness of not less than 10 nm nor more than 40 nm, and more preferably a physical film thickness of 30 nm. The adhesive layer 3 functions to strengthen adhesion between the underlayer film 2 and the reflection film 4.

The reflection film 4 is made of, for example, silver (Ag), and thus the reflection film 4 can reflect incident light with high reflectance. Preferably, the reflection film 4 has a physical film thickness of not less than 80 nm nor more than 200 nm, and more preferably a physical film thickness of 100 nm.

The reflectance adjusting layer 5 is a high-refractive-index dielectric layer having not only the function of improving the durability of the reflection film 4 but also the function of improving the reflectivity of the reflection film 4. Specifically, the reflectance adjusting layer 5 has a three-layer structure comprising an aluminum oxide film 51, a zirconium oxide ($ZrO_2$) film 52 and a silicon dioxide ($SiO_2$) film 53, which are stacked on the reflection film 4 in this sequence. Since the aluminum oxide film 51 has low moisture permeability and excellent mechanical strength, the aluminum oxide film 51 functions to prevent moisture from reaching the reflection film 4 and to protect the reflection film 4 from external mechanical force. The zirconium oxide film 52 has excellent mechanical strength and exhibits a relatively high refractive index. Furthermore, the silicon dioxide film 53 is excellent in wear resistance and thus functions as a protective film for protecting the zirconium oxide film 52, the aluminum oxide film 51 and the reflection film 4.

The water-repellent film 6 is made of a compound containing fluorine and silicon, such as OF-110 (commercially available from Optron Ltd.) or WR2 (commercially available from Merck & Co., Inc.), and thus the water-repellent film 6 is excellent in moisture resistance and salt water resistance and thus has the function of preventing external moisture or the like from entering the reflection film 4. Preferably, the water-repellent film 6 has a physical film thickness of not less than 1 nm nor more than 10 nm. The reason is as follows. The water-repellent film 6 having a physical film thickness of 1 nm or more is sufficient to prevent the entry of external moisture or the like, and the water-repellent film 6 having a physical film thickness of 10 nm or less does not cause deterioration in spectral reflectance because of having no effect upon the reflectivity. More preferably, the water-repellent film 6 has a physical film thickness of 5 nm.

Next, the description is given with reference to FIG. 1 with regard to a method of manufacturing the reflecting mirror according to the first embodiment.

Firstly, the plastic substrate 1 is prepared, and the surface of the plastic substrate 1 on which the underlayer film 2 is to be formed (i.e., the stacked-structure-forming surface 1A) is subjected to ion bombardment. The ion bombardment takes place for about 20 minutes, using argon (Ar) or nitrogen ($N_2$).

The plastic substrate 1 subjected to the ion bombardment is attached to a holder (not shown), and the plastic substrate 1 is inserted into a vacuum chamber (not shown) and is fixed at a predetermined position in the vacuum chamber. Then, the vacuum chamber is evacuated to about $1.3 \times 10^{-4}$ Pa under no heating, and the vacuum chamber is kept in this state.

Then, the underlayer film 2 is formed on the ion-bombarded surface of the plastic substrate 1 by use of vacuum evaporation. When electron beam evaporation (i.e., vacuum evaporation using an electron beam emitted from an electron gun to heat an evaporation source) is used as the vacuum evaporation, a power supply voltage is set to, for example, 5 kV, and the beam current value of the electron gun is set to, for example, 300 mA.

Then, the adhesive layer 3 is formed through the process which involves forming the chromium film 31 on the underlayer film 2 by use of electron beam evaporation, and then forming the copper film 32 on the chromium film 31 by use of resistive heating evaporation.

Then, the reflection film 4 made of silver is formed on the copper film 32 by use of, for example, resistive heating evaporation. Then, the reflectance adjusting layer 5 having the three-layer structure is formed by stacking the aluminum oxide film 51, the zirconium oxide film 52 and the silicon dioxide film 53 in this sequence on the reflection film 4 by use of, for example, electron beam evaporation.

Finally, the water-repellent film 6 is formed by use of, for example, resistive heating evaporation so as to cover the silicon dioxide film 53. Thus, the reflecting mirror is completed through the above-described processes. Incidentally, it is desirable for the above-mentioned vacuum evaporations that the temperature of the plastic substrate 1 be maintained at about 50 degrees or less.

Next, the description is given with reference to FIG. 1 with regard to the function of the reflecting mirror according to the first embodiment.

The plastic substrate 1 has high moisture absorption and further has high moisture permeability. Thus, moisture may enter the reflection film 4 and cause discoloration or corrosion of the reflection film 4. Since the underlayer film 2, however, has low moisture absorption and also has low moisture permeability, the underlayer film 2 functions as a shield layer for shutting out moisture and thus prevents moisture permeating through the plastic substrate 1 from entering the reflection film 4. Moreover, the ion bombardment using argon (Ar) or nitrogen ($N_2$) is employed to remove impurities from the surface of the plastic substrate 1 on which the underlayer film 2 is to be formed, so that the plastic substrate 1 has desired surface roughness and thus improves in adhesion between the plastic substrate 1 and the stacked structure 20.

The water-repellent film 6 prevents moisture, in particular salt water having metallic corrosion properties, from entering through the surface of the reflecting mirror into the reflection film 4. Moreover, the water-repellent film 6 is excellent in wear resistance and thus functions as a protective film for protecting the reflectance adjusting layer 5 and the reflection film 4 formed on the plastic substrate 1.

The adhesive layer 3 functions to strengthen the adhesion between the underlayer film 2 and the reflection film 4, thereby preventing the reflection film 4 from peeling off from the underlayer film 2. The reflectance adjusting layer 5 improves the durability and reflectivity of the reflection film 4. Specifically, the aluminum oxide film 51 formed on the reflection film 4 on the side opposite to the plastic substrate 1 prevents moisture from entering the reflection film 4 and protects the reflection film 4, thereby improving the durability of the reflection film 4. The zirconium oxide film 52 improves the durability and reflectivity of the reflection film 4. Furthermore, the silicon dioxide film 53 protects the zirconium oxide film 52, the aluminum oxide film 51 and the reflection film 4, thereby improving the mechanical strength of the reflecting mirror.

As described above, the reflecting mirror according to the first embodiment has the plastic substrate 1, and the stacked structure 20 formed on the plastic substrate 1. The stacked structure 20 includes the underlayer film 2 made of aluminum oxide, which is formed on the plastic substrate 1; and the reflection film 4 made of silver, which is formed on the underlayer film 2 with the adhesive layer 3 in between. This configuration makes it possible to prevent moisture permeating through the plastic substrate 1 from entering the reflection film 4. Thus, the reflection film 4 does not undergo corrosion, so that it is possible to obtain the reflecting mirror which is excellent in durability, that is, moisture resistance and mechanical strength, while maintaining excellent reflectivity. In particular when the underlayer film 2 has a physical film thickness of not less than 40 nm nor more than 200 nm, the underlayer film 2 can have the function of shutting out moisture with higher reliability and also can minimize the internal stress of the underlayer film 2. This makes it possible to obtain the reflecting mirror which exhibits more excellent moisture resistance and mechanical strength.

Furthermore, the stacked structure 20 comprises the water-repellent film 6 including the compound containing fluorine and silicon. This configuration allows preventing the entry of moisture, in particular salt water having metallic corrosion properties, through the surface of the reflecting mirror on the side opposite to the plastic substrate 1. This configuration also enables preventing deterioration in the reflectivity due to wear of the surface of the reflecting mirror. Therefore, the reflecting mirror which is more excellent in moisture resistance, salt water resistance and durability can be obtained. In particular when the water-repellent film 6 has a physical film thickness of not less than 1 nm nor more than 10 nm, it is possible to obtain the reflecting mirror which is excellent in moisture resistance, salt water resistance and durability, while maintaining excellent reflectivity.

Moreover, the method of manufacturing the reflecting mirror according to the first embodiment includes the step of cleaning the surface of the plastic substrate 1 by means of the ion bombardment using argon (Ar) or nitrogen ($N_2$), and the step of forming the stacked structure 20 on the plastic substrate 1. Thus, the adhesion between the plastic substrate 1 and the stacked structure 20 can be improved. Therefore, the reflecting mirror having excellent durability can be obtained.

[Second Embodiment]

Next, the description is given with regard to the configuration and function of a reflecting mirror according to a second embodiment of the invention. Hereinafter, the parts which are substantially the same as the structural components of the above-described first embodiment are indicated by the same reference numerals, and the description thereof is appropriately omitted.

Figure 2:
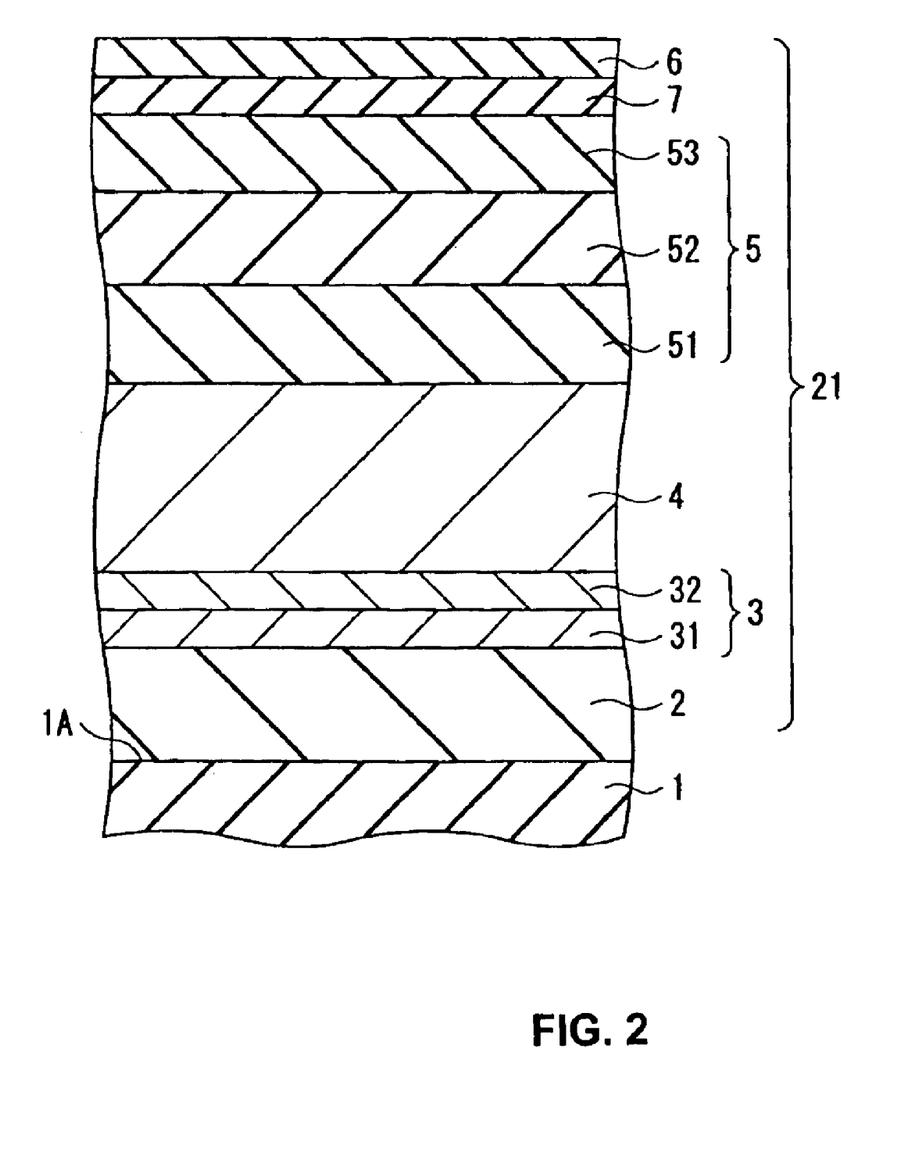
FIG. 2 is a cross-sectional view showing the configuration of a cross section of a reflecting mirror according to a second embodiment of the invention.

The reflecting mirror of the second embodiment is configured to further include a protective film which is sandwiched between the reflection film and the water-repellent film and located closest to the water-repellent film, in addition to the configuration of the reflecting mirror of the above-described first embodiment. The reflecting mirror of the second embodiment will be specifically described below.

FIG. 2 is a cross-sectional view showing the configuration of a cross section of a stacked structure of the reflecting mirror according to the second embodiment. As shown in FIG. 2, the reflecting mirror of the second embodiment comprises the plastic substrate 1, and a stacked structure 21 formed on the plastic substrate 1. The stacked structure 21 includes: the underlayer film 2; the reflection film 4 made of silver, which is formed on the side opposite to the plastic substrate 1 with respect to the underlayer film 2; and the water-repellent film 6 having the compound containing fluorine and silicon, which is formed on the side opposite to the underlayer film 2 with respect to the reflection film 4.

The stacked structure 21 further has the adhesive layer 3 between the underlayer film 2 and the reflection film 4, and the reflectance adjusting layer 5 and a protective film 7 which are sandwiched between the reflection film 4 and the water-repellent film 6 and are stacked on the reflection film 4 in this sequence.

The protective film 7, which has silicon monoxide (SiO) as a main component, is formed by means of, for example, vacuum evaporation, and thus the protective film 7 is excellent in wear resistance (i.e., durability). Furthermore, the reflecting mirror including the protective film 7 has higher reflectance than the reflecting mirror not including the protective film 7, because the refractive index of silicon monoxide is higher than the refractive index of silicon dioxide. Preferably, the protective film 7 has a physical film thickness of not less than 5 nm nor more than 20 nm. The reason is as follows. The protective film 7 having a thickness of more than 20 nm may absorb an incident light beam and thus cause deterioration in the reflectivity, and the protective film 7 having a thickness of less than 5 nm cannot achieve sufficient wear resistance. More preferably, the protective film 7 has a physical film thickness of 10 nm because the protective film 7 of 10 nm thick can offer a good balance between the reflectivity and the wear resistance, both of which are excellent.

As described above, the reflecting mirror according to the second embodiment further includes the protective film 7 which is sandwiched between the reflection film 4 and the water-repellent film 6 and located closest to the water-repellent film 6, in addition to the configuration of the reflecting mirror of the above-described first embodiment. This configuration allows achieving more excellent mechanical strength, thus improving the reliability of the reflecting mirror. Thus, the reflecting mirror is less likely to suffer damage, for example even when a user erroneously touches the surface of the reflecting mirror. Furthermore, the reflecting mirror including the protective film 7 can achieve more excellent reflectivity.

[Third Embodiment]

Next, the description is given with regard to the configuration and function of a reflecting mirror according to a third embodiment of the invention. Hereinafter, the parts which are substantially the same as the structural components of the above-described first and second embodiments are designated by the same reference numerals, and the description thereof is appropriately omitted.

Aluminum (Al) is used as the reflection film of the reflecting mirror of the third embodiment, although silver is used as the reflection films of the reflecting mirrors of the above-described first and second embodiments. The reflecting mirror of the third embodiment will be specifically described below.

Figure 3:
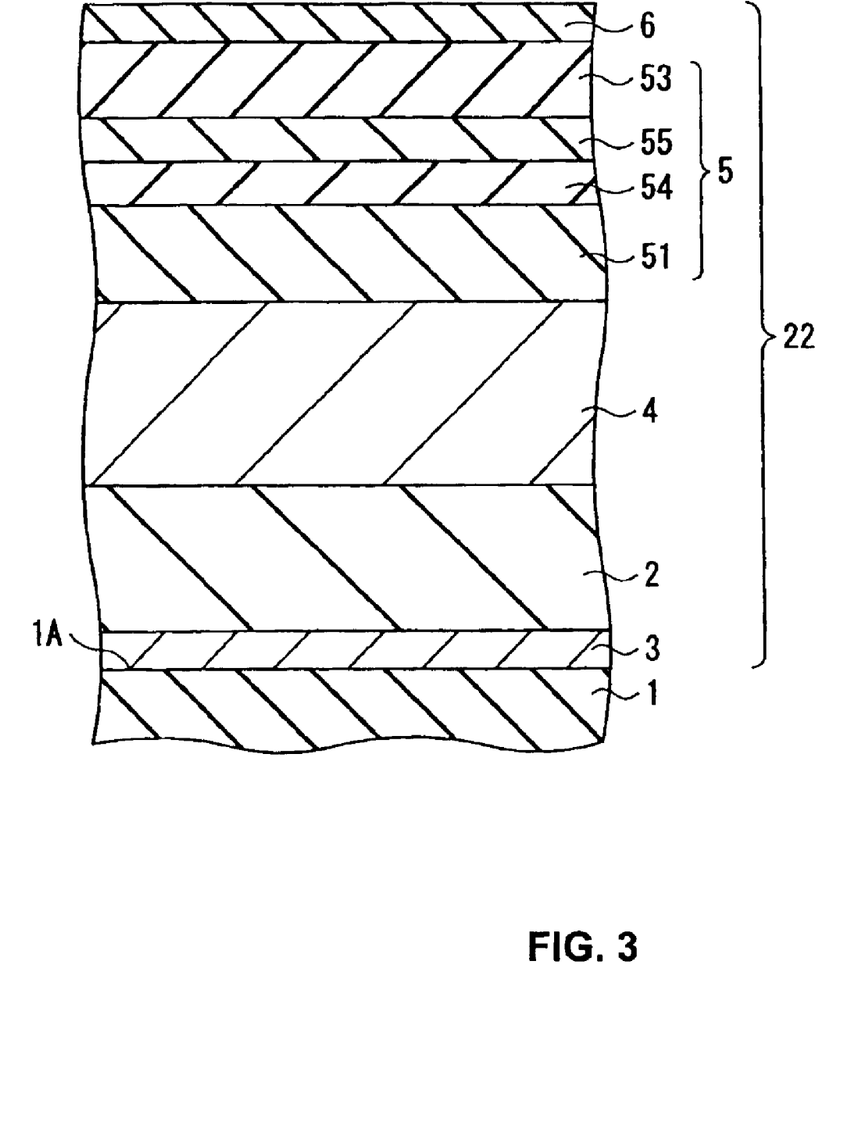
FIG. 3 is a cross-sectional view showing the configuration of a cross section of a reflecting mirror according to a third embodiment of the invention.

FIG. 3 is a cross-sectional view showing the configuration of a cross section of a stacked structure of the reflecting mirror according to the third embodiment. As shown in FIG. 3, the reflecting mirror of the third embodiment comprises the plastic substrate 1, and a stacked structure 22 formed on the plastic substrate 1. The stacked structure 22 includes: the underlayer film 2; the reflection film 4 formed on the underlayer film 2 on the side opposite to the plastic substrate 1; and the water-repellent film 6 having the compound containing fluorine and silicon, which is formed on the side opposite to the underlayer film 2 with respect to the reflection film 4.

The stacked structure 22 further has the adhesive layer 3 between the plastic substrate 1 and the underlayer film 2, and the reflectance adjusting layer 5 between the reflection film 4 and the water-repellent film 6.

The adhesive layer 3 is made of, for example, chromium (Cr), and has a physical film thickness of not less than 5 nm nor more than 15 nm and preferably a physical film thickness of 10 nm. The adhesive layer 3 strengthens the adhesion between the plastic substrate 1 and the underlayer film 2.

The reflection film 4 is made of aluminum (Al), and thus the reflection film 4 can reflect incident light with high reflectance. Preferably, the reflection film 4 has a physical film thickness of not less than 80 nm nor more than 200 nm, and more preferably a physical film thickness of 100 nm.

The reflectance adjusting layer 5 has a four-layer structure comprising the aluminum oxide ($Al_2O_3$) film 51, a magnesium fluoride ($MgF_2$) film 54, a cerium dioxide ($CeO_2$) film 55 and the silicon dioxide ($SiO_2$) film 53, which are stacked on the reflection film 4 in this sequence. Since the aluminum oxide film 51 has low moisture permeability and excellent mechanical strength, the aluminum oxide film 51 functions to prevent moisture from reaching the reflection film 4 and to protect the reflection film 4 from external mechanical force. Preferably, the aluminum oxide film 51 has a physical film thickness of not less than 20 nm nor more than 60 nm, and more preferably a physical film thickness of 40 nm. The magnesium fluoride film 54 and the cerium dioxide film 55 exhibit the effect of increasing reflection. Preferably, the magnesium fluoride film 54 has a physical film thickness of not less than 20 nm nor more than 60 nm, and more preferably a physical film thickness of 50 nm. Preferably, the cerium dioxide film 55 has a physical film thickness of not less than 15 nm nor more than 50 nm, and more preferably a physical film thickness of 40 nm. Furthermore, the silicon dioxide film 53 is excellent in wear resistance and thus functions as a protective film for protecting the reflection film 4, the aluminum oxide film 51, the magnesium fluoride film 54 and the cerium dioxide film 55. Preferably, the silicon dioxide film 53 has a physical film thickness of not less than 20 nm nor more than 70 nm, and more preferably a physical film thickness of 50 nm. When the above-mentioned physical film thicknesses of the aluminum oxide film 51, the magnesium fluoride film 54, the cerium dioxide film 55 and the silicon dioxide film 53 are below the respective lower limits, these films cannot sufficiently achieve the aforementioned effect and functions. On the other hand, when the physical film thicknesses of the films 51, 54, 55 and 53 are above the respective upper limits, these films absorb an excess of visible light and thus cannot obtain sufficient reflectance.

The water-repellent film 6 is made of the compound containing fluorine and silicon, such as OF-110 (commercially available from Optron Ltd.) or WR2 (commercially available from Merck & Co., Inc.), as in the case of the above-described first and second embodiments.

Next, the description is given with reference to FIG. 3 with regard to a method of manufacturing the reflecting mirror according to the third embodiment.

Firstly, the plastic substrate 1 is prepared, the plastic substrate 1 is attached to a holder (not shown), and the plastic substrate 1 is inserted into a vacuum chamber (not shown) and is fixed at a predetermined position in the vacuum chamber. In the third embodiment, ion bombardment is not necessary for the stacked-structure-forming surface 1A of the plastic substrate 1.

Then, the vacuum chamber is evacuated to about $1.3 \times 10^{-4}$ Pa under no heating, and the vacuum chamber is kept in this state.

Then, the adhesive layer 3 is formed on the plastic substrate 1 by means of vacuum evaporation such as electron beam evaporation. Then, the underlayer film 2 is formed on the adhesive layer 3 by use of, for example, electron beam evaporation.

Then, the reflection film 4 made of aluminum is formed on the underlayer film 2 by use of, for example, resistive heating evaporation. Then, the reflectance adjusting layer 5 having the four-layer structure is formed by stacking the aluminum oxide film 51, the magnesium fluoride film 54, the cerium dioxide film 55 and the silicon dioxide film 53 in this sequence on the reflection film 4 by use of, for example, electron beam evaporation. It is desirable that the silicon dioxide film 53 be formed by the method which involves heating silicon monoxide, which is used as an evaporation source, by an electron beam or the like; oxidizing silicon monoxide in an atmosphere of oxygen ($O_2$); and thereby evaporating silicon monoxide. The reason is as follows. The silicon dioxide film 53 formed by adopting the above-mentioned forming method improves in wear resistance, in particular.

Finally, the water-repellent film 6 is formed by use of, for example, resistive heating evaporation so as to cover the silicon dioxide film 53 of the reflectance adjusting layer 5. Thus, the reflecting mirror is completed through the above-described processes. Incidentally, it is desirable for the above-mentioned vacuum evaporations that the temperature of the plastic substrate 1 be maintained at about 50 degrees or less.

Next, the description is given with reference to FIG. 3 with regard to the function of the reflecting mirror according to the third embodiment.

The plastic substrate 1 has high moisture absorption and further has high moisture permeability. Thus, moisture may cause the reflection film 4 to discolor or corrode. Since the underlayer film 2, however, has low moisture absorption and also has low moisture permeability, the underlayer film 2 functions as the shield layer for shutting out moisture and thus prevents moisture permeating through the plastic substrate 1 and the adhesive layer 3 from entering the reflection film 4. Moreover, the adhesive layer 3 improves adhesion between the plastic substrate 1 and the stacked structure 22 without the need to perform a process such as ion bombardment using argon (Ar) or nitrogen ($N_2$).

Moreover, the reflectance adjusting layer 5 improves the durability and reflectivity of the reflection film 4. Specifically, the aluminum oxide film 51 formed on the reflection film 4 on the side opposite to the plastic substrate 1 prevents moisture from entering the reflection film 4 and protects the reflection film 4, thereby improving the durability of the reflection film 4. The magnesium fluoride film 54 and the cerium dioxide film 55 improve the reflectivity (i.e., the reflectance in the visible light range) of the reflection film 4. Furthermore, the silicon dioxide film 53 protects the reflection film 4, the aluminum oxide film 51, the magnesium fluoride film 54, the cerium dioxide film 55, and the like, thereby improving the mechanical strength of the reflecting mirror.

The water-repellent film 6 prevents moisture, in particular salt water having metallic corrosion properties, from entering through the surface of the reflecting mirror into the reflection film 4. Moreover, the water-repellent film 6 is excellent in wear resistance and thus functions as the protective film for protecting the reflectance adjusting layer 5 and the reflection film 4 formed on the plastic substrate 1.

As described above, the reflecting mirror according to the third embodiment has the plastic substrate 1, and the stacked structure 22 formed on the plastic substrate 1. The stacked structure 22 includes: the underlayer film 2 made of aluminum oxide, which is formed on the plastic substrate 1 with the adhesive layer 3 in between; and the reflection film 4 made of aluminum, which is formed on the underlayer film 2. This configuration makes it possible to prevent moisture permeating through the plastic substrate 1 from entering the reflection film 4, while keeping high adhesion between the plastic substrate 1 and the stacked structure 22. The stacked structure 22 further includes the reflectance adjusting layer 5 including the magnesium fluoride film 54 and the cerium dioxide film 55, which are formed on the side opposite to the plastic substrate 1 with respect to the reflection film 4. This configuration allows improving the durability and reflectance of the reflection film 4. Thus, the reflection film 4 does not undergo corrosion, so that it is possible to obtain the reflecting mirror which is excellent in durability, that is, moisture resistance and mechanical strength, while exhibiting excellent reflectivity.

Furthermore, the stacked structure 22 comprises the water-repellent film 6 including the compound containing fluorine and silicon. This configuration permits preventing the entry of moisture, in particular salt water having metallic corrosion properties, through the surface of the reflecting mirror on the side opposite to the plastic substrate 1. This configuration also enables preventing deterioration in the reflectivity due to wear of the surface of the reflecting mirror. Therefore, the reflecting mirror which is more excellent in moisture resistance, salt water resistance and durability can be obtained.

In the third embodiment, the silicon dioxide film 53 is formed by the method which involves heating silicon monoxide which is used as the evaporation source, oxidizing silicon monoxide in an atmosphere of oxygen, and thereby evaporating silicon monoxide. Thus, the wear resistance can be further improved.

The reflecting mirror of the third embodiment may further include the protective film containing silicon monoxide, which is sandwiched between the reflection film 4 and the water-repellent film 6 and located closest to the water-repellent film 6 (that is, between the reflectance adjusting layer 5 and the water-repellent film 6), in the same manner as the reflecting mirror of the above-described second embodiment. In this case, the wear resistance further improves.

EXAMPLES

Next, the detailed description is given with regard to specific examples of the invention.

The same reflecting mirrors as the reflecting mirrors shown in FIGS. 1 to 3 were manufactured in the above-described manner, and environmental tests were performed on the reflecting mirrors. Table 1 shows the results of the tests. Each of examples 1 and 2 is the reflecting mirror of the first embodiment having the stacked structure 20 shown in FIG. 1, an example 3 is the reflecting mirror of the second embodiment having the stacked structure 21 shown in FIG. 2, and an example 4 is the reflecting mirror of the third embodiment having the stacked structure 22 shown in FIG. 3. Incidentally, the same tests were performed on conventional reflecting mirrors, each of which does not include the underlayer film made of aluminum oxide and the water-repellent film, and the results of the tests are shown as comparative examples in Table 1, along with the test results of the examples 1 to 4.

TABLE 1

|  | Substrate material | Adhesion test | Wear test | Moisture resistance test | Salt water immersion test | Salt spray test | High-temperature test | Heat cycle test |
|---|---|---|---|---|---|---|---|---|
| Example 1 | Substrate A | ○ | ○ | ○ | ○ | ○ | ○ | ○ |
| Example 2 | Substrate B | ○ | ○ | ○ | ○ | ○ | ○ | ○ |
| Example 3 | Substrate B | ○ | ◎ | ○ | ○ | ○ | ○ | ○ |
| Example 4 | Substrate B | ○ | ○ | ○ | ○ | ○ | ○ | — |
| Comparative example 1 | Substrate A | X | X | X | ○ | X | ○ | ○ |
| Comparative example 2 | Substrate B | ○ | X | X | ○ | X | ○ | ○ |
| Comparative example 3 | Substrate C | ○ | X | ○ | ○ | X | ○ | ○ |

Two types of substrates A and B were used as substrate materials. Test subjects are seven types of tests: an adhesion test, a wear test, a salt water immersion test, a moisture resistance test, a salt spray test, a high-temperature test, and a heat cycle test (however, the heat cycle test was not performed on some specimens).

The adhesion test, the wear test and the moisture resistance test were carried out in conformity with MIL (Military Standards)-C-675C, and the salt spray test was carried out in conformity with MIL-STD-810D. The salt water immersion test was performed to see whether or not corrosion was detected after each reflecting mirror had been immersed in a 5% sodium chloride (NaCl) solution at ordinary temperatures for 3 hours. The high-temperature test was performed to see whether or not cracking, peeling or the like was detected on the film-formed surface of each reflecting mirror after each reflecting mirror had been held at a temperature of 70 degrees for 5 hours. The heat cycle test was performed to see whether or not cracking, peeling or the like was detected on the film-formed surface of each reflecting mirror after 8 repetitions of the heat cycle which involved holding each reflecting mirror at −20 degrees for 2 hours, then raising the temperature of each reflecting mirror to 65 degrees in 2 hours, then holding each reflecting mirror at 65 degrees as they were for 2 hours, and then lowering the temperature thereof to −20 degrees in 2 hours. In Table 1, the symbol "○" indicates that a problem interfering with practical use is not found, and the symbol "X" indicates that a problem interfering with practical use is found. The symbol "◎" indicates that properties are particularly excellent.

The example 1 and a comparative example 1 are the reflecting mirrors each using the substrate A, and the examples 2 to 4 and a comparative example 2 are the reflecting mirrors each using the substrate B. A comparative example 3 is the reflecting mirror using a substrate C made of a material different from the materials of the substrates A and B.

As shown in Table 1, the examples 1 to 4 do not have such a problem as interferes with practical use, regarding all the performed tests.

The adhesion test showed that, although partial peeling was detected in the comparative example 1 using the substrate A, no peeling occurred in the example 1 using the substrate A in the same manner. The wear test showed that, although flaws were detected in all the comparative examples 1 to 3, such a flaw as becomes a problem was not detected in the examples 1 to 4. No flaw was discovered, particularly in the example 3 including the protective film 7. The moisture resistance test showed that, although discoloration was detected in the comparative examples 1 and 2, discoloration did not occur in the examples 1 to 4. The salt spray test showed that, although corrosion occurred in all the comparative examples 1 to 3, such corrosion as becomes a problem in terms of practical use did not occur in the examples 1 to 4 although slight discoloration was found in part of the peripheral portions thereof.

Figure 4:
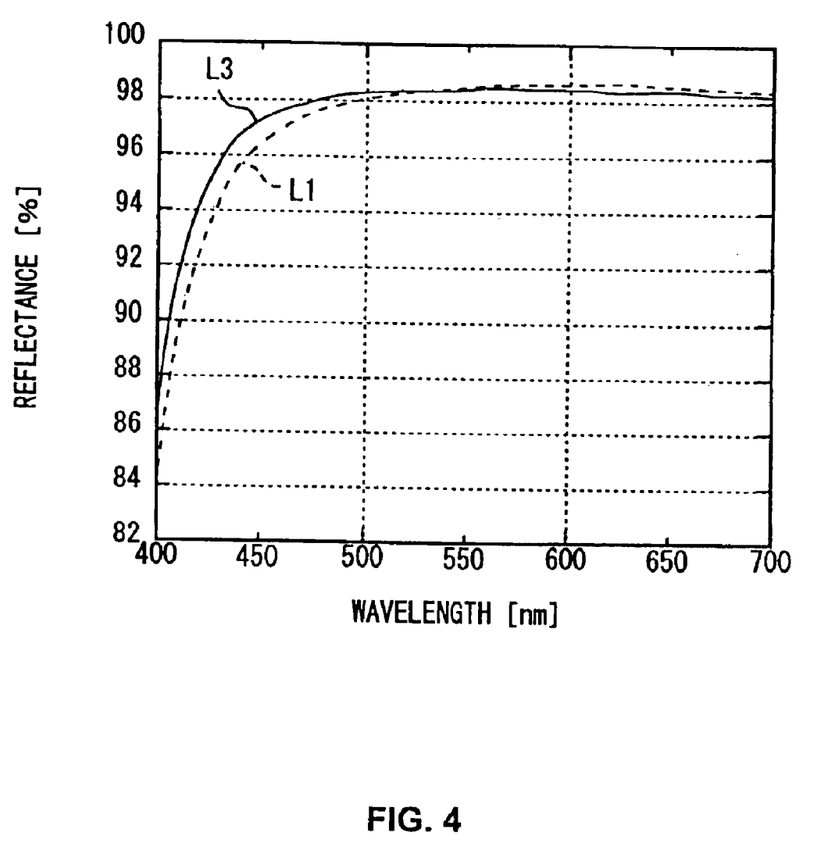
FIG. 4 is a plot showing the reflectances of the reflecting mirrors shown in FIGS. 1 and 2.

Next, measurements were made on the reflecting mirrors of the examples 1 and 3 so as to measure the wavelength dependence of the reflectance of each reflecting mirror. In this case, an incident angle was set to 45 degrees under no polarization. The results of the measurements are shown in FIG. 4. In FIG. 4, a curve L1 shows the results of the example 1, and a curve L3 shows the results of the example 3.

As shown in FIG. 4, a decrease in the reflectance due to the presence of the underlayer film 2 and the water-repellent film 6 does not occur in the reflecting mirrors of the examples 1 and 3, and the reflecting mirrors maintain high reflectance throughout the visible light range. Thus, the reflecting mirrors of the examples 1 and 3 are at a level at which there is no problem about their functions. The reflecting mirror of the example 3, in particular, includes the protective film 7 containing silicon monoxide whose refractive index is higher than the refractive index of silicon dioxide, so that the reflecting mirror exhibited relatively high reflectance in the range of short wavelengths of approximately 400 nm to 500 nm.

Figure 5:
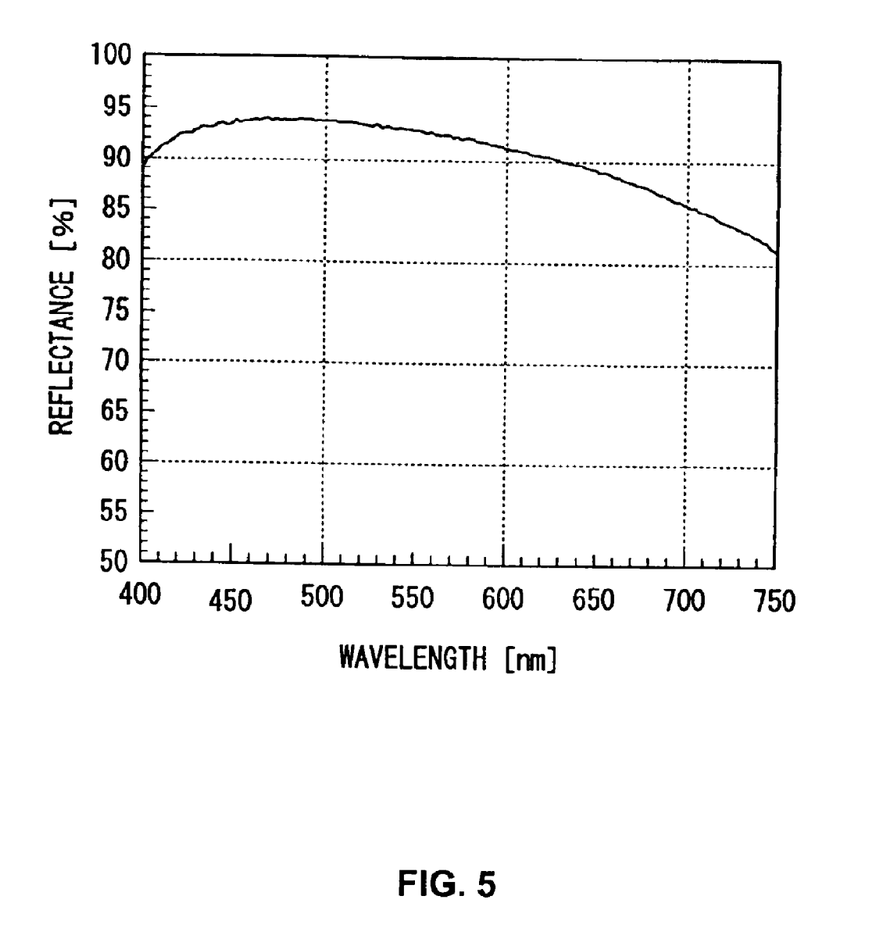
FIG. 5 is a plot showing the reflectance of the reflecting mirror shown in FIG. 3.

In the same manner, measurements were made on the reflecting mirror of the example 4 so as to measure the wavelength dependence of the reflectance of the reflecting mirror, and the results of the measurements are shown in FIG. 5.

As can be seen from FIG. 5, the reflecting mirror of the example 4 exhibited very high reflectance, such as reflectance in excess of 90% in a band of wavelengths of approximately 400 nm to 600 nm, whereas a conventional aluminum reflecting mirror generally has reflectance of the order, at most, of 84%. This results mainly from the effect of increasing reflection, which is achieved by the magnesium fluoride film 54 and the cerium dioxide film 55.

The following are apparent from the above-mentioned results. When the stacked structure 20, 21 or 22 formed on the plastic substrate 1 includes the underlayer film 2 made of aluminum oxide, the reflection film 4 made of silver or aluminum, and the water-repellent film 6 including the compound containing fluorine and silicon, this configuration makes it possible to prevent moisture permeating through the plastic substrate 1 from entering the reflection film 4, and thus the reflection film 4 does not undergo discoloration or corrosion. Thus, it is possible to obtain the reflecting mirror which is excellent in moisture resistance and mechanical strength, while maintaining excellent reflectivity.

In particular when the underlayer film 2 has a physical film thickness of 100 nm, the underlayer film 2 can shut out moisture with higher reliability and also can minimize the internal stress of the underlayer film 2. This makes it possible to obtain the reflecting mirror which is more excellent in moisture resistance and mechanical strength.

When the stacked structure further has the water-repellent film 6 located farthest apart from the plastic substrate 1 with respect to the reflection film 4, this configuration allows preventing the entry of moisture, in particular salt water having metallic corrosion properties, through the surface of the reflecting mirror on the side opposite to the plastic substrate 1. This configuration also enables preventing wear of the surface of the reflecting mirror. In particular when the water-repellent film 6 has a physical film thickness of not less than 1 nm nor more than 10 nm, it is possible to obtain the reflecting mirror which is more excellent in moisture resistance, salt water resistance and mechanical strength, as well as capable of maintaining more excellent reflectivity.

When the stacked structure further includes the protective film 7 containing silicon monoxide, which is sandwiched between the reflection film 4 and the water-repellent film 6 and located closest to the water-repellent film 6, this configuration allows achieving particularly excellent wear resistance.

When at least the surface of the plastic substrate 1 on which the underlayer film 2 is to be formed is cleaned by means of the 20-minute ion bombardment using argon (Ar) or nitrogen ($N_2$) in order to form the underlayer film 2 directly on the plastic substrate 1, this process allows improving the adhesion between the plastic substrate 1 and the stacked structure 20, thus achieving more excellent mechanical strength.

Although the invention has been described above by referring to the embodiments and the examples, the invention is not limited to the above-mentioned embodiments and various modifications of the invention are possible. For example, although the vacuum evaporation using electron beam heating is applied so as to form the underlayer film 2, other methods such as ion beam deposition may be used.

In the embodiments and the examples, the adhesive layer 3 has the two-layer structure comprising the chromium film 31 and the copper film 32 or a single-layer structure comprising the chromium film. However, the adhesive layer 3 is not limited to these embodiments and examples but may have a stacked structure comprising three layers or more.

Although the reflecting mirror including the adhesive layer 3 and the reflectance adjusting layer 5 has been described by referring to the embodiments and the examples, the reflecting mirror does not necessarily have to include the adhesive layer 3 and the reflectance adjusting layer 5.

As described above, the reflecting mirror of the invention includes the plastic substrate, and the stacked structure formed on the plastic substrate. The stacked structure includes the underlayer film made of aluminum oxide, the reflection film formed on the side opposite to the plastic substrate with respect to the underlayer film, and the water-repellent film having the compound containing fluorine and silicon, which is formed on the side opposite to the underlayer film with respect to the reflection film. This configuration makes it possible to prevent moisture permeating through the plastic substrate or moisture permeating through the surface of the reflecting mirror from entering the reflection film. Thus, the reflection film does not undergo corrosion, so that it is possible to ensure a good balance between the reflectivity and the durability, both of which are excellent.

In particular when the reflection film is made of silver (Ag) or aluminum (Al), this configuration allows achieving relatively high reflectance in the visible light range.

In particular when the water-repellent film has a physical film thickness of not less than 1 nm nor more than 10 nm, this configuration permits achieving excellent moisture resistance, excellent salt water resistance and excellent mechanical strength, while maintaining more excellent reflectivity.

In particular when the underlayer film has a physical film thickness of not less than 40 nm nor more than 200 nm, the underlayer film can shut out moisture with higher reliability and also can minimize the internal stress of the underlayer film. This makes it possible to achieve more excellent moisture resistance and more excellent mechanical strength.

In particular when the stacked structure further has the reflectance adjusting layer sandwiched between the reflection film and the water-repellent film, this configuration enables improving both the mechanical strength and the reflectivity.

When the stacked structure further has the protective film containing silicon monoxide, which is sandwiched between the reflection film and the water-repellent film and located closest to the water-repellent film, this configuration allows further improvement in the durability.

Obviously many modifications and variations of the present invention are possible in the light of the above teachings. It is therefore to be understood that within the scope of the appended claims the invention may be practiced otherwise than as specifically described.

What is claimed is:

1. A reflecting mirror comprising a plastic substrate, and a stacked structure formed on the plastic substrate, the stacked structure from the plastic substrate side sequentially comprising:

an underlayer film made of aluminum oxide ($Al_2O_3$);

an adhesive layer formed with a chrome film and a copper film from the underlayer film side;

a reflection film made of silver (Ag);

a reflectance adjusting layer;

a protective film containing silicon monoxide (SiO) and having a film thickness of not less than 5 nm and not more than 20 nm; and a water-repellent film having a compound containing fluorine and silicon and having a film thickness of not less than 1 nm and not more than 10 nm.

2. A reflecting mirror according to claim 1, wherein the underlayer film has a physical film thickness of not less than 40 nm nor more than 200 nm.

* * * * *